United States Patent [19]

Olejak

[11] Patent Number: 4,823,827

[45] Date of Patent: Apr. 25, 1989

[54] FLOAT SYSTEM FOR ACCUMULATOR

[76] Inventor: Ingo Olejak, 6815 Farnaby Ct., Spring, Tex. 77379

[21] Appl. No.: 212,237

[22] Filed: Jun. 27, 1988

[51] Int. Cl.⁴ ........................ F16K 33/00; F16K 31/24

[52] U.S. Cl. ........................................ 137/2; 137/207; 137/397; 137/430; 137/433; 138/31; 138/42; 73/322.5

[58] Field of Search ................... 137/2, 192, 207, 326, 137/397, 398, 429, 430, 433, 434, 593; 251/127; 138/30, 31, 37, 40, 42, 44; 73/322.5

[56] References Cited

U.S. PATENT DOCUMENTS

| | | | |
|---|---|---|---|
| 436,177 | 9/1890 | Holmes | 137/434 |
| 1,890,024 | 12/1932 | Souligne | 137/425 |
| 2,376,178 | 5/1945 | Ornstein | 137/593 |
| 2,394,437 | 2/1946 | Freeman | 73/322.5 |
| 2,912,111 | 11/1959 | Kovac, Jr. | 137/433 |
| 4,278,105 | 7/1981 | Koomey | 137/433 |
| 4,294,288 | 10/1981 | Murthy | 137/397 |
| 4,301,827 | 11/1981 | Murthy et al. | 137/397 |
| 4,541,464 | 9/1985 | Christiansen | 137/446 |

FOREIGN PATENT DOCUMENTS

| | | | |
|---|---|---|---|
| 1142736 | 1/1963 | Fed. Rep. of Germany | 137/446 |

*Primary Examiner*—George L. Walton
*Attorney, Agent, or Firm*—Alan R. Thiele

[57] ABSTRACT

A float system for a ball type accumulator includes a circular hollow float member which surrounds the float travel guide rod in the ball type accumulator. Connecting the float member to the vertical guide rod is a ball member which is located in the center of the float. A circular arcuate band surrounds the ball member thus allowing the float to tilt with respect to the vertical guide rod as the level of the fluid tilts within the accumulator. The tilting of the float prevents the float from flooding when the ball type accumulator is moved.

13 Claims, 2 Drawing Sheets

FLOAT SYSTEM FOR ACCUMULATOR

BACKGROUND OF THE INVENTION

The present invention relates to accumulators for use with high pressure hydraulic systems such as used in oilwell blowout prevention control systems. More particularly, the present invention relates to float systems for an accumulator wherein a hollow float is movable along a vertical guide rod within the accumulator. The float is used to close a shutoff valve at the bottom of the accumulator to prevent the escape of precharged gas.

When a new accumulator is moved from a point of manufacture to a point of installation or a used accumulator is moved from one site to another, it is often necessary to tilt the accumulator when removing it from its mounting and loading it onto a vehicle. Such tilting of accumulators often causes the problem of flooding of the hollow float. Specifically, fluid enters the float through the vent tube. The vent tube assures that the pressure within the hollow float is the same as the pressure on the outside of the float. Once the float has been flooded it sinks to the bottom of the accumulator. The only way of repairing the accumulator is to disassemble the tank and repair or replace the float. Such repair is a complex and expensive undertaking.

In order to prevent disabling of the accumulator by flooded floats, various valve actuator systems have been proposed. One system employs a collapsible float which can be removed from an enlarged opening in the bottom of the accumulator whenever the float floods.

In another system, an expanding bladder is used instead of a float The expanding bladder increases in size as the accumulator empties. When the bladder is large enough, it contacts the valve at the bottom of the accumulator thus causing the valve to close.

Yet another system is described in U.S. Pat. No. 4,294,288 to Murthy. In this system, a rotating accumulator float is weighted on one side. When the accumulator is tilted the fluid level is at an angle with respect to the float travel guide rod. The weight in the float causes the float to rotate around the guide rod thus moving the vent outlet above the level of the fluid in the accumulator. When the accumulator is upright the float engages the float travel guide rod with a moment arm caused by the uneven distribution of weight in the float. Eventually this moment arm will cause the float or the guide rod to wear. This wearing effect will reduce the ability of the float to travel up and down the guide rod and eventually render the accumulator unservicable. Additionally, if the accumulator is tilted on an axis passing through the weight, the float may not rotate with sufficient speed to prevent fluid from entering the vent tube and flooding the float.

There is therefore a need in the art to provide a float system for a ball type accumulator which will remain unflooded when the ball type accumulator is tilted or moved. Such float system should not place a moment arm on the float travel guide rod and should not require any undue movement of the float with respect to the vertical guide rod. Additionally, such float should respond quickly to any tilting of the accumulator.

SUMMARY OF THE INVENTION

The float system of the present invention, typically used with a ball type accumulator, includes a circular float mounted on a universal hinge. A circular float surrounds the float travel guide rod which passes through the center of the accumulator. The float travels up and down the guide rod. When the float, which is positioned by the fluid contained in the accumulator, reaches a low enough position it engages a collar on the guide rod. The collar causes the guide rod to move toward the bottom of the accumulator. This movement of the guide rod causes the valve at the bottom of the accumulator to close, thereby sealing off the accumulator.

In the float system of the present invention, the vertical guide member is surrounded by a ball member. The ball member includes a straight hole which passes through the center of the ball member to accommodate the float travel guide rod. Surrounding the ball member is a circular arcuate band. The circular arcuate band slidably engages the ball member and also provides a mounting for the circular float. The slidable engagement of the circular arcuate band with the ball member permits the float to tilt with respect to the guide rod. This tilting action allows the float to remain substantially even with the level of the liquid whenever the ball type accumulator is tilted. Were the float not able to remain substantially even with the level of the liquid, the liquid in the ball type accumulator would enter the pressure equalization vent and flood the float thereby causing it to sink. Such sinking is prevented by the float system of the present invention which assures that the float will remain on top of the liquid at all times.

BRIEF DESCRIPTION OF THE DRAWINGS

A better understanding of the float system of the present invention may be had by reference to the figures wherein.

DESCRIPTION OF THE FIGURES

Figure 1:
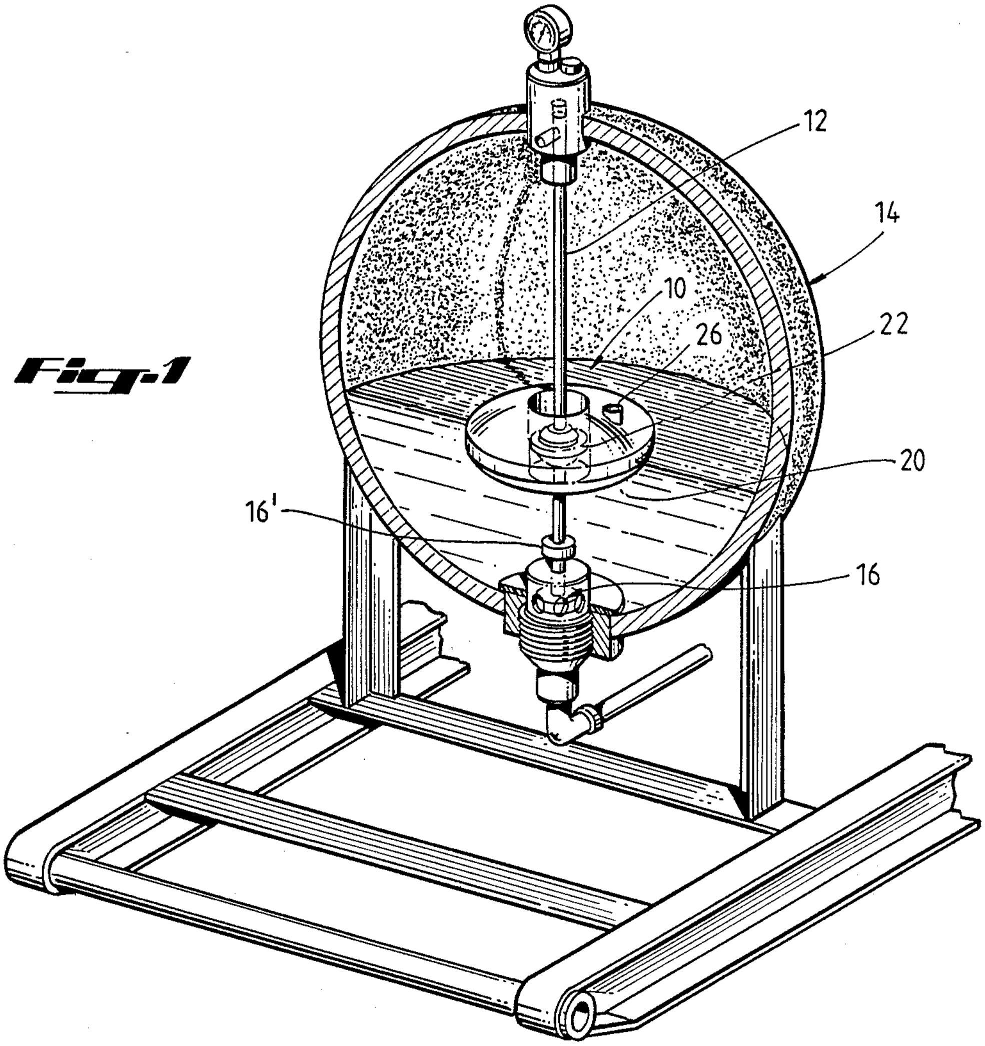
FIG. 1 is a perspective sectional view of a ball type accumulator showing utilization of the float system of the present invention in a ball type accumulator.
Figure 2:
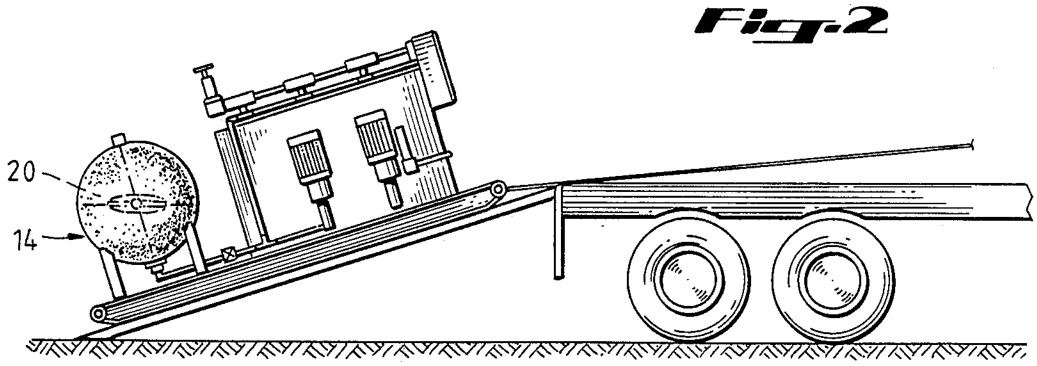
FIG. 2 is a schematic view of a tilted ball type accumulator system being off-loaded or on-loaded the bed of a truck.

As may be seen in FIG. 1, float assembly 10 of the present invention is located in the midst of a ball type accumulator 14. Float assembly 10 rides up and down on vertical float travel guide rod 12. When float assembly 10 is near the bottom of its travel it contacts collar 16 on vertical guide rod 12. When collar 16 is engaged by float assembly 10, vertical guide rod 12 is pulled down by the weight of the float to physically close valve assembly 16. Ball type accumulators 14 are normally located on skids and moved from place to place on flat bed vehicles. As shown in FIG. 2, such movement causes tilting of accumulator 14. In prior art accumulators, such tilting has caused flooding of the float. When the float is flooded, the accumulator is useless.

Float assembly 10 consists of three essential parts. The first part is float 20 which is a hollow cylindrical member formed substantially in the shape of a donut. Such float members are typically formed of sheet metal and sealed to be leak-proof. In the base of float 20 is opening 32 which allows float 20 to tilt with respect to vertical guide 12. It has been found that permitting a tilt of up to 60° will be adequate for most applications.

The second essential part of the float system of the present invention is ball member 22. Ball member 22 is constructed to surround and slidably engage vertical guide rod 12. This is accomplished by the formation of a straight opening 30 through the center of ball member 22. The third essential portion of the present invention is a circular arcuate band 24 which slidably engages ball member 22. The interaction of band 24 with ball member 22 permits float 20 to tilt with respect to guide rod 12. Accordingly, float 20 may ride up and down guide rod 12 according to the level of liquid or fluid contained within ball type accumulator 14. The degree of tilt of float 20 with respect to guide rod 12 is controlled by the size of opening 32 formed in the bottom of float 20. The size of opening 32, the size of arcuate band 24 and the vertical positioning of arcuate band 24 with respect to float 20 determine the degree of tilt of float 20 with respect to guide rod 12.

Figure 4:
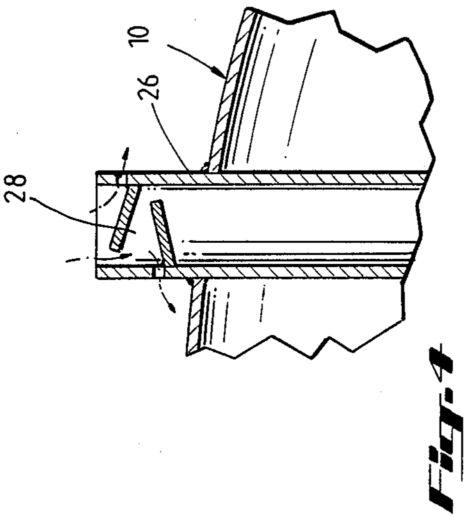
FIG. 4 is a sectional view of a float vent tube.
Figure 3:
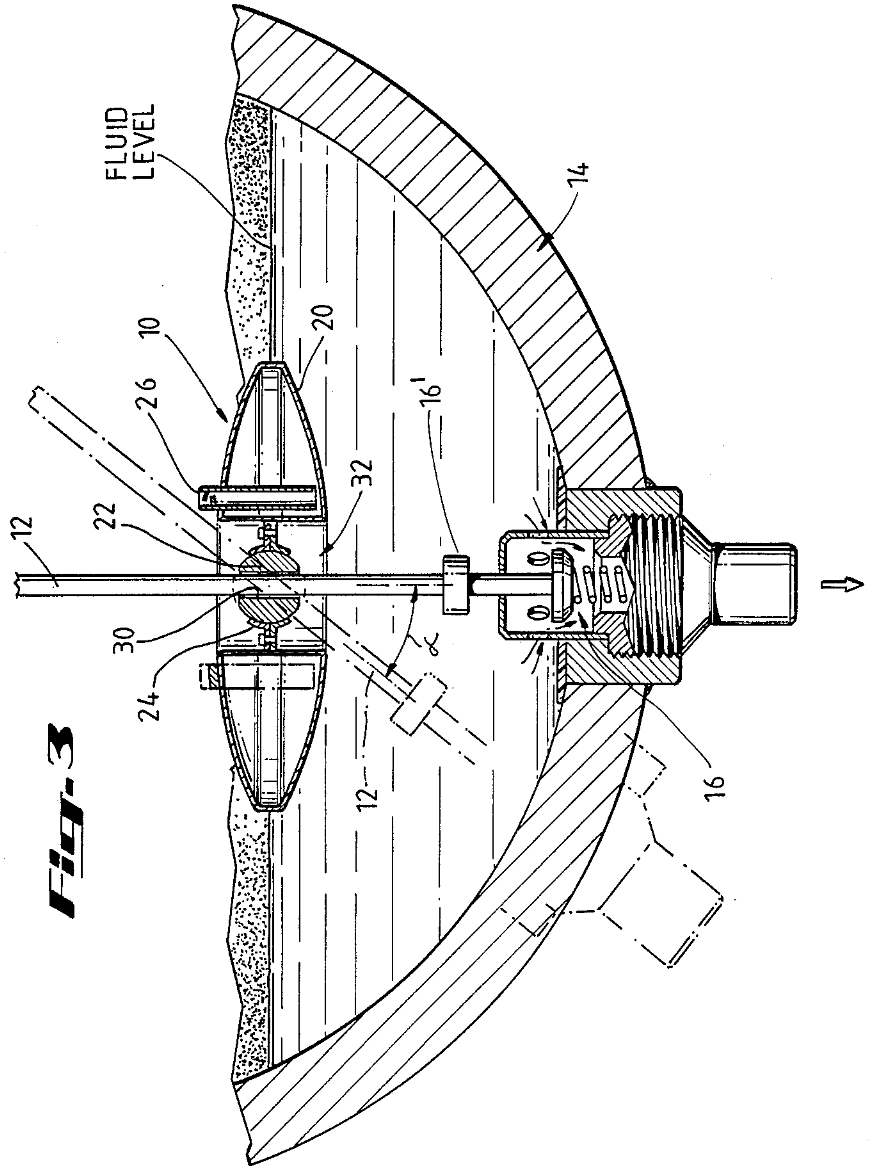
FIG. 3 is a sectional view of a lower portion of the ball type accumulator showing its engagement with the vertical guide rod.

Also contained within float 20 is vent tube 26 (FIG. 4). In order o prevent any fluid which may splash within ball type accumulator from entering vent tube 26 and flooding the inside of float 20, a series of vanes 30 is included in vent tube 26 to form a labyrinth path 28 in the top of vent tube 20. Vent tube 20 allows the pressure on the inside and outside of float 20 may be equalized. Without such equalization of pressures, the pressure within ball accumulator 14 would crush float 20 thereby rendering it useless.

In the preferred embodiment, a second vent or counterweight 34 is added opposite vent 26. Such vent or counterweight reduces any moment that may be caused by the weight of vent tube 26. It will be understood that float system 10 of the present invention is operable without second vent 34 or an equivalent counterweight.

OPERATION

The installation of a ball type accumulator 14 requires moving it from its place of assembly or manufacture to its place of installation. Oftentimes such ball type accumulators 14 contain fluid and despite careful handling are tilted when being moved (FIG. 2). If the ball type accumulator 14 is tilted and the float is rigidly mounted around the guide rod, the liquid contained within the ball type accumulator 14 will flow over the float and eventually enter the mouth of the float vent. When the liquid fills the float, the float is rendered useless and travels to the bottom of the vertical guide rod thus closing the valve at the bottom of the accumulator. Because the float is flooded, it remains stuck at the bottom of the guide rod. The only way to remedy this problem is to disassemble the accumulator.

In the device of the present invention, the hollow float 20 always remains at the level of the fluid as it is able to tilt with respect to guide rod 12. As the fluid tilts with respect to the guide rod 12 so too does float 20 tilt. When the ball type accumulator 14 is mounted in its upright position, float 20 is able to ride up and down the length of the guide rod 12 and serve its function of closing valve 16 at the bottom of the ball type accumulator 14 when the fluid in the ball type accumulator 14 reaches a low level. Because of the use of ball member 22, the wear on guide rod 12 is reduced. Such reduction in wear is caused by the reduction in surface contact of the float system 10 with guide rod 12.

There is thereby provided by the float system 10 of the present invention a method for preventing the flooding of floats in ball type accumulators 14 when said accumulators 14 are moved from one location to another.

The foregoing embodiment of the accumulator float system is intended to illustrate the design and operation of the invention and not to limit in spirit or scope.

I claim:

1. A float system for use within accumulator comprising:

a substantially vertical guide rod;

a substantially circular hollow float constructed and arranged to surround said substantially vertical guide rod;

a ball member having a substantially straight opening therethrough, said substantially straight opening passing through the center of said ball member and constructed and arranged to slidably engage said vertical guide rod;

means for slidably coupling said ball member to said substantially circular hollow float so that said substantially hollow float may tilt with respect to said vertical guide rod;

whereby when said accumulator is in an upright position said substantially circular hollow float will move up and down along said substantially vertical guide rod and when said accumulator is tilted, said coupling means will permit said circular hollow float to tilt with respect to said substantially vertical guide rod so as to prevent flooding of said substantially circular hollow float.

2. The float system as defined in claim 1 wherein said means for slidably coupling said ball member to said substantially circular hollow float is a circular arcuate band.

3. The float system as defined in claim 2 wherein said substantially circular hollow float contains a vent tube.

4. The float system as defined in claim 3 wherein said vent tube includes a labyrinth path at its outer end.

5. The float system as defined in claim 3 further including an additional vent tube or counterweight to nullify the moment effect of said vent tube.

6. The float system as defined in claim 2 wherein the lower portion of said substantially circular hollow float member includes a space which permits an angle of tilt of the substantially circular hollow float of up to 60° with respect to said substantially guide rod.

7. A ball type accumulator comprising:

a substantially spherical hollow tank;

a valve member located in a lower portion of said tank, said valve member being biased to a normally open position;

a substantially vertical guide rod including an actuator for closing said valve member;

a substantially circular hollow float constructed and arranged to surround said substantially vertical guide rod;

a ball member having a substantially straight opening therethrough, said substantially straight opening passing through the center of said ball member and constructed and arranged to slidably engage the vertical guide rod;

means for slidably coupling said ball member to said substantially hollow float so that said float may tilt with respect to said vertical guide rod;

whereby when said float reaches a low enough position on said substantially vertical guide rod, the weight of said float will cause said vertical guide rod valve to close said valve member and when said accumulator is in an upright position said substantially circular hollow float will move up and down along said substantially vertical guide rod and when said accumulator is tilted, said coupling means will permit said substantially circular hollow float to tilt with respect to said substantially guide rod so as to prevent flooding of said substantially circular hollow float.

8. The float system as defined in claim 6 wherein said means for slidably coupling said ball member to said substantially circular hollow float is a circular arcuate band.

9. The float system as defined in claim 7 wherein said substantially circular hollow float contains a vent tube.

10. The float system as defined in claim 8 wherein said vent tube includes a labyrinth path at its outer end.

11. The float system as defined in claim 9 further including an additional vent tube or counterweight to nullify the moment effect of said vent tube.

12. The float system as defined in claim 7 wherein the lower portion of said substantially circular hollow float member includes a space which permits an angle of tilt of the substantially circular hollow float of up to 60° with respect to said substantially vertical guide rod.

13. A method for providing a combination float and valve closing system in a bowl type accumulator comprising the steps of:

providing said bowl type accumulator with a float travel guide rod;

surrounding said float travel guide rod with a ball member;

surrounding said ball member with a substantially circular hollow float;

coupling said ball member to said substantially circular hollow float with an arcuate band so that said substantially circular hollow float may tilt with respect to said guide rod;

whereby when said accumulator is in an upright position said substantially circular hollow float will move up and down along said guide rod and when said accumulator is tilted, said arcuate band will permit said substantially circular hollow float to tilt with respect to said guide rod so as to prevent flooding of said substantially circular hollow float.

* * * * *